United States Patent [19]

Gonsot

[11] Patent Number: 4,666,271

[45] Date of Patent: May 19, 1987

[54] PROCESS AND APPARATUS FOR THE SUBTITLING AND/OR THE TRICK PHOTOGRAPHY OF CINEMATOGRAPHIC FILMS USING PARTICULARLY A SCREEN COPIER AND A COMPUTER

[76] Inventor: Christian Gonsot, 21 bd Elemir Bourges, 04100 Manosque, France

[21] Appl. No.: 766,963

[22] Filed: Aug. 19, 1985

[30] Foreign Application Priority Data

Aug. 17, 1984 [FR] France ................................ 84 13003
May 17, 1985 [FR] France ................................ 85 07580

[51] Int. Cl.$^4$ .......................................... G03B 21/32
[52] U.S. Cl. ...................................... 352/90; 352/87; 355/39
[58] Field of Search ...................... 352/87, 90; 355/39

[56] References Cited

U.S. PATENT DOCUMENTS

| 2,232,144 | 2/1941 | Sersen . | |
|---|---|---|---|
| 3,731,995 | 5/1973 | Reiffel | 352/87 |
| 4,245,906 | 1/1981 | Froehlich | 352/90 |
| 4,346,403 | 8/1982 | Tamura | 352/87 |
| 4,537,481 | 8/1985 | Witty | 352/87 |

FOREIGN PATENT DOCUMENTS

| 2533328 | 3/1984 | France . | |
|---|---|---|---|
| 56-46215 | 4/1981 | Japan | 352/87 |
| 2036369 | 6/1980 | United Kingdom . | |

OTHER PUBLICATIONS

IBM Technical Disclosure Bulletin, vol. 20, No. 7, Dec. '77, pp. 2913, 2914.
"Computer-Produced Movies" from *Science*, vol. 150, Nov. 1965, pp. 1116–1120.
"Computerized Cartoons" from *Machine Design*, Apr. 15, 1971, pp. 71–77.

*Primary Examiner*—Monroe H. Hayes
*Attorney, Agent, or Firm*—Young & Thompson

[57] ABSTRACT

The present invention consists of registering, selecting and counting the N images of a cinematographic film (C1) to be subtitled; the composition of the said subtitles (C1) to be subtitled; the composition of the said subtitles is composed by computer, then copied on a black and white film (NB1) of N images by means of a screen copier (1); this composition of subtitling is recorded in memory (5) on computer (4); the color film (C2) and the black and white film (NB2), with subtitles, permit obtaining, by superposition, the color copy (C2) with reserved spaces for the subtitles, (NB2 being the developed film NB1), a color copy film (C2) the subtitles of which are still perceptible thus being obtained; the color copy film (C2) is loaded into the camera (2) of the screen copier (1), while the subtitles memorized then colored by the computer are projected onto the screen of the screen copier with a perfect alignment with respect to the images of the color film copy (C2) which is in place in the camera of the said screen copier; the subtitles are colored.

8 Claims, 7 Drawing Figures

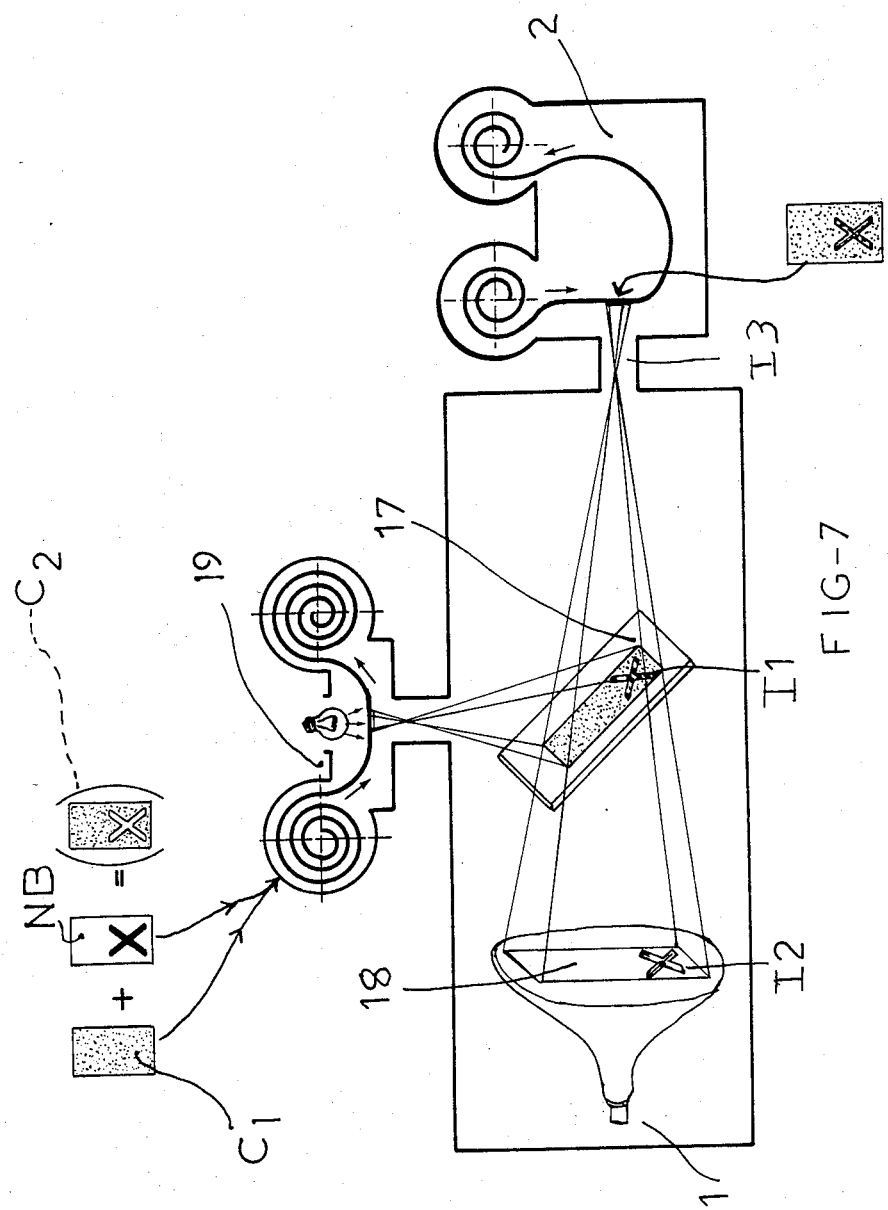

PROCESS AND APPARATUS FOR THE SUBTITLING AND/OR THE TRICK PHOTOGRAPHY OF CINEMATOGRAPHIC FILMS USING PARTICULARLY A SCREEN COPIER AND A COMPUTER

The invention has for an object a process and its apparatus for the subtitling and/or the trick photography of photographic films.

At present, subtitling presents a major disadvantage of being legible only with difficulty, as the letters do not always stand out well from the background, the subtitles generally being in white or when they are in color, the subtitle is of a single color. The color is therefore chosen for many images of which the color of the background is not uniform and may vary from one image to the next; it follows that one part of the text is legible, and the next is blended with the background of the image.

Another disadvantage in the current subtitling of film resides in the manipulation of the films, which is long and which therefore considerably increases the cost.

Thus, at present a thin layer of wax is placed on the film, then with acid baths the text is etched on the thin layer. Another significant disadvantage is that the acid may run.

The state of the art may be defined by the following patents: FR A 2,128,829, 2,239,708, 2,353,106, and 2,533,328.

To these patents may be added the following patents: U.S. Pat. No. 2,232,144; this old patent describes a process known by the generic name "travelling mattes" which consists of superposing artificed films.

It does not consider the images, it does not compose the subtitles by computer, it does not execute copies with reserved spaces for the subtitles and it does not use an image copier, nor a coloring logic unit for varying the color of the subtitle as a function of the background etc.

The patent FR-A-2,533,328 uses a shield and a laser beam to execute inscriptions on a film.

The patent GB-A-2,036,369 similarly uses a laser beam.

The invention avoids all these disadvantages. It permits obtaining subtitles in colors of which the color may vary in the subtitle as a function of the background of each image. Thus, the beginning of the subtitle may be in red, the middle in black, the end in blue with all the intermediate gradations possible. Furthermore, the subtitling is done automatically, with little manipulation of films, and no acid baths nor any supervision during operation controlled by the computer during the screen copy.

The process and its apparatus have, as an application, principally the subtitling of films; but it is possible to apply the said process and its apparatus to the trick photography of cinematographic films.

The process according to the invention consists of registering, selecting, and counting the N images of a cinematographic film C1 to be subtitled; the composition of the said subtitles is composed by a computer, then copied on a black and white film (NB1) of N images by means of a screen copier or "imager" used a first time; this subtitling composition is recorded in memory on computer; the said subtitles are at that time black on the transparent background with the maximum contrast; the color film C1 and the black and white film NB2 with subtitles permit obtaining, by superposition, a color copy C2 with reserved spaces for the subtitles (NB2 being the developed film NB1), a color copy C2 being thus obtained of which the subtitles are still perceptible; the color copy film C2 is loaded into the screen copier, used a second time, while the subtitles recorded in memory then colored by the computer are projected onto the screen of the screen copier with a perfect alignment with respect to the images of the color copy film C2 which is in place in the camera of the said screen copier; the colored subtitles are filmed, a final color film C2 suitable for developing being thus obtained. The subtitled color film comprises colored subtitles.

The coloration of the subtitles may be effected by an automatic or manual selection program. In one embodiment where the selection of the colors is made by the intermediary of the computer, a camera, connected at the level of the computer digitalizes the image of the cinematographic film C1 so as to permit its informational treatment.

The film NB2 may be used, by superposition, at no matter what moment of the copy C1. If the superposition takes place at the moment of the color copy C1, there is obtained, by superposition with NB2, an opposing color copy C2. If the superposition takes place at the level of the internegative C1, there is obtained, by superposition with NB2, a color positive C2.

The apparatus for realizing the process according to the invention is composed of the following elements:
- a central computer with its memory unit (placing in memory the subtitles),
- a vectorial treatment unit (graphical process),
- a screen copier,
- a color monitor,
- a coloration logic unit, and depending on the circumstances:
- a mounting table screen,
- a supplementary digital camera.

The process for the subtitling and/or trick photography of cinematographic films consists of registering, selecting, and counting the N images of a cinematographic film C1 to be subtitled; the composition of the said subtitles is composed by a computer, then copied on a black and white film (NB1) of N images by means of a screen copier or "imager" 1 used a first time; this subtitling composition is recorded in memory 5 on computer 4; the color film C1 and the black and white film NB2, with subtitles 14, permit obtaining, by superposition at no matter what moment of the said copy C1, a color copy C2 with reserved spaces 15 for subtitles, (NB2 being the developed film NB1); a color copy C2 being thus obtained of which the subtitles are still perceptible; the color film copy C2 is loaded into the camera 2 of the screen copier 1, used a second time, while the subtitles recorded in memory then colored by the computer are projected to the screen of the screen copier with a perfect alignment with respect to the images of the color copy film C2 which is in place in the camera of the said screen copier; the colored subtitles are filmed, a final color film C2 suitable for developing being thus obtained; the subtitled color film comprises colored subtitles.

According to this process, there is used a known apparatus named "TRUCCA" which can project two films, in this case a black and white film NB2 with the subtitles and a color film C1, superposing them; these two superposed films permit obtaining a color copy C2 with reserved spaces 15 for the subtitles, the said subtitles being still perceptible. It is necessary then to effect another operation in loading the color film copy C2 in the camera 2 of the screen copier 1, used a second time. The colored subtitles are then filmed, a color film C2 suitable for developing thus being obtained.

According to another embodiment the invention tends to simplify the process according to the invention, at this stage.

To this effect, the process according to the invention consists of utilizing a projector which projects the two superposed films, the black and white and the color copy, in the screen copier onto a medium serving as a semi-reflecting mirror. The image present on the said semi-reflecting mirror is the superposition of the image projected by the projector (two superposed films), and the image which occurs on the screen of the said screen copier and which is viewed through the said mirror.

The apparatus for performing the process according to the invention comprises a screen copier with its screen, a camera, a projector able to project one or several superposed films, and a means serving as a semi-reflecting mirror.

The said semi-reflecting mirror is disposed before the screen of the screen copier while forming an angle with the vertical axis, so that the projector can project an image on the said semi-reflecting mirror and simultaneously the camera can film the image projected on the said mirror and the image viewed on the screen through the said mirror.

The process according to the invention simplifies the process described in the principal patent application in doing away with an intermediate step.

The accompanying drawings, given by way of indicative and non-limiting example will permit clear understanding of the invention. They represent a preferred embodiment according to the invention.

FIG. 7 is a view displaying the action of the semi-reflecting mirror in the screen copier.

Figure 1:
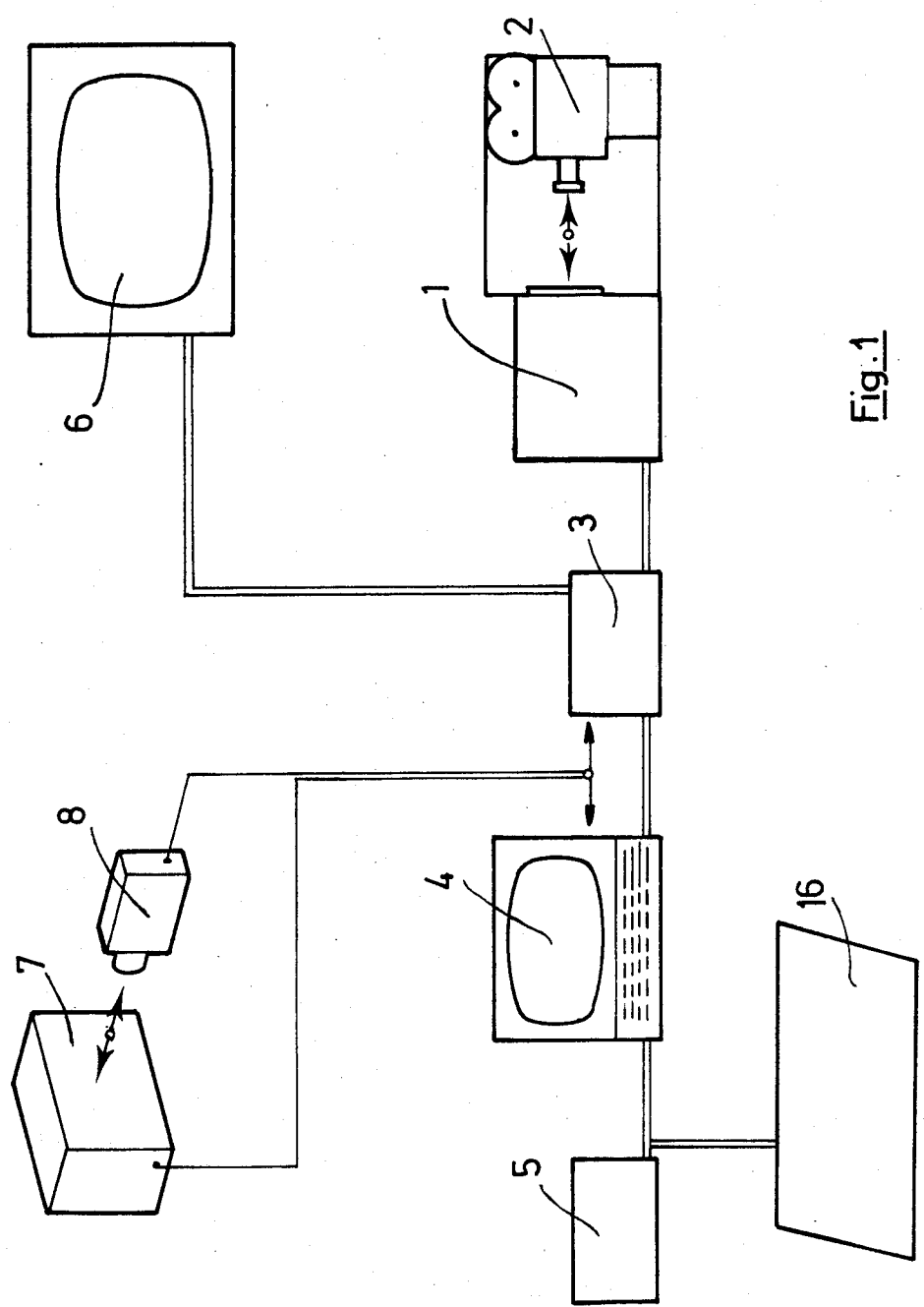
FIG. 1 is a view of the apparatus displaying the equipment utilized.

In FIG. 1 are shown the following elements.

The screen copier 1 with its camera 2 (for example an "imager" screen copier LOG.E.Dunn or Matrix). This copier is connected to the vectorial treatment unit (graphical process) 3, (for example of the type Jupiter or Vextrix, registered trademarks). This vectorial treatment unit 3 is controlled by the computer 4. The computer 4 arranges a diskette unit 5 for the recording in memory of the subtitles and a coloration logic unit. A color monitor 6 may be set in place at the level of the vectorial treatment unit 3. Finally, a screen 7, for a mounting or inspection table, may be connected to the apparatus, if necessary with a digital camera 8.

Figure 2:
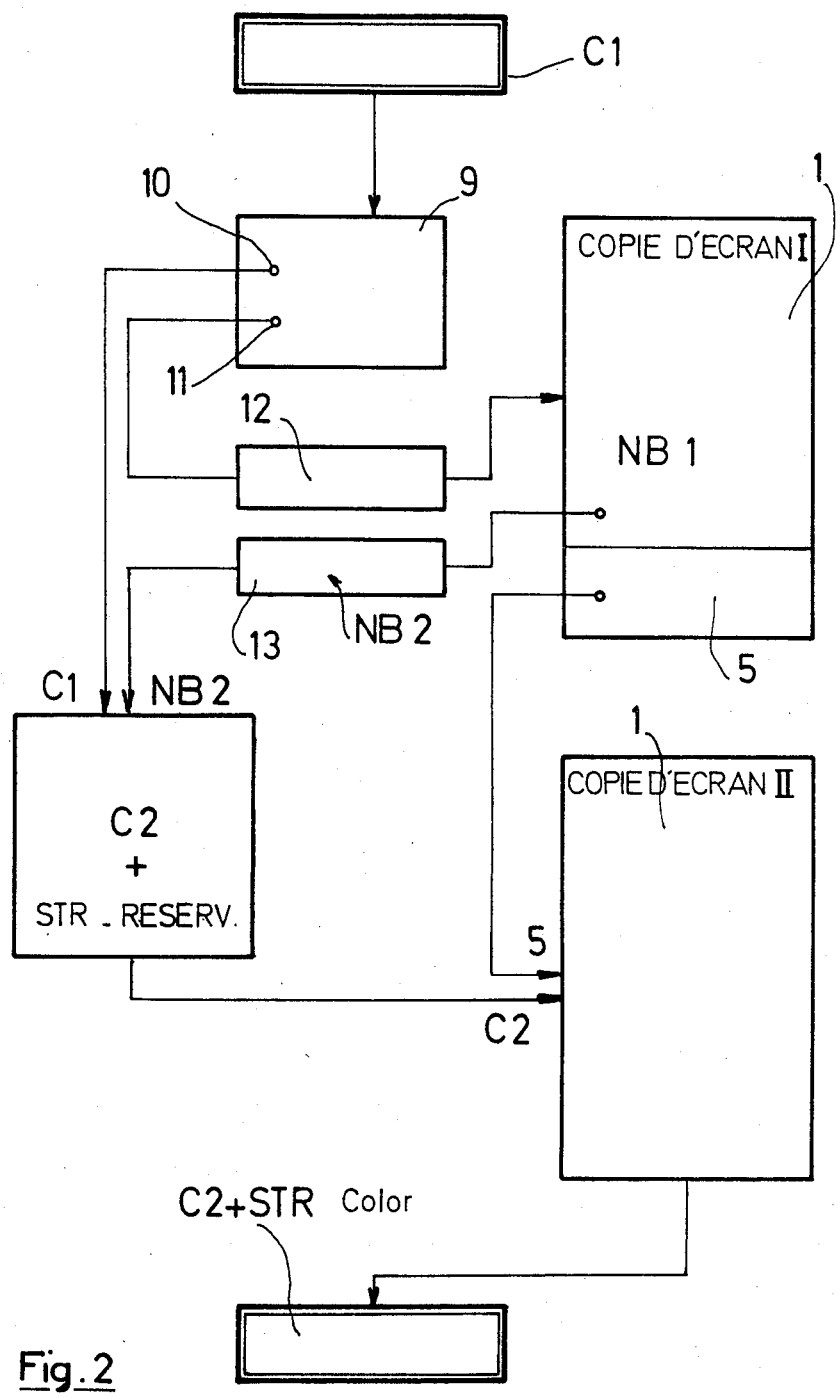
FIG. 2 is a diagram displaying the different chronological steps of the process.

The diagram shown in FIG. 2 permits visualizing the different steps of the process.

Starting from the complete color film C1, a registering operation 9 is effected.

The registering operation consists of selecting at 10, the images and of counting at 11, the said images N.

From the counting of the number of images 11, the composition 12 of the subtitles in digital form is effected. To this end, the computer 4 is employed. The subtitling is done using for a first time the screen copier 1. The subtitles are obtained in black on the transparent background with the maximum of contrast. The subtitles 14 are fixed on a black and white film NB. The film NB1 is developed at 13, it comprising the subtitles 14. The subtitles 14 are simultaneously memorized in digital form by the computer 4 on a memory unit 5 for example with diskettes.

Figure 5:
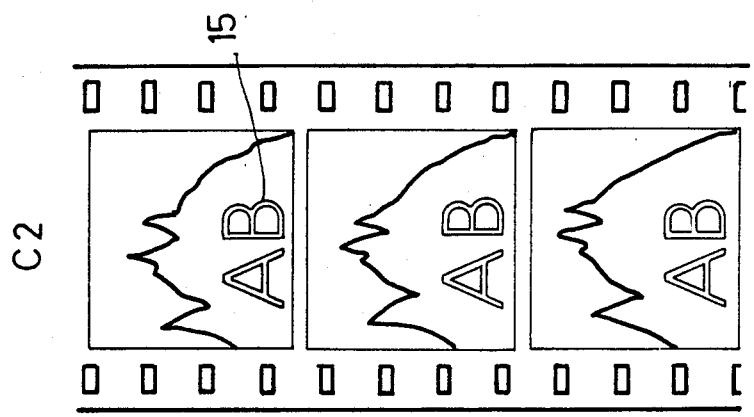
FIG. 5 is a diagram of the undeveloped color film C2, obtained from the superposition of films C1 (shown in FIG. 3) and NB (shown in FIG. 4), which permit obtaining a color film C2 with the reserved spaces for subtitling.
Figure 4:
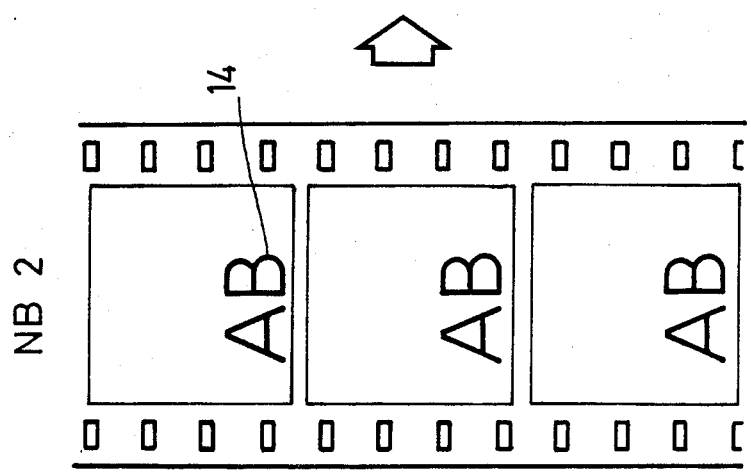
FIG. 4 is a diagram of the images of the black and white film NB.
Figure 3:
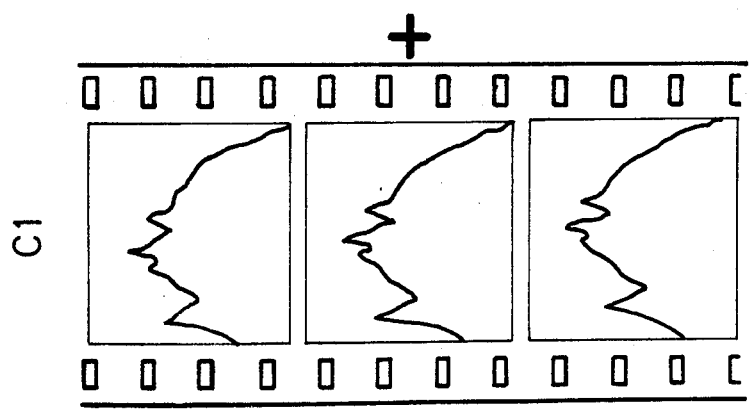
FIG. 3 is a diagram of the images of the color film C1.

From the color copy C1, the film NB2 (which is the developed film NB1) is utilized to obtain the reserved spaces for the subtitling (see FIGS. 3, 4 and 5). The superposition of the films C1 and NB2 permit obtaining a color film C2 a part 15 of which is not exposed but reserved for the subtitles 14 (color copy C2+RESERV). This film C2 is not developed but reused in the "imager" screen copier 1.

The screen copier 1 is utilized a second time, the copy C2 being loaded in the said copier of images, the memorized subtitles in digital form being reemployed after coloration by the computer 4. The copier, camera assembly is controlled by the computer 4. The coloration is obtained at the level of the copy C2 by filters of the screen copier 1 controlled by the computer 4.

In this second passage of the subtitles 14 in the screen copier 1, the said subtitles are in color. The color may be chosen manually or by the intermediary of the computer (composition assisted by the computer with the aid of a graphical table 16). This latter is assisted by a logic unit, controlling a coloration in colors complementary with respect to the background. The computer may likewise operate automatically in analyzing the process image, which may be perceived and digitalized by a camera 8 retransmitting a projection of the base film C1. This projection is parallel to the screen copy 1 (phase II).

It being understood, the process according to the invention may be applied to the trick photography of films. Thus, with drawings on a bracket, or a graphical tablet 16, the drawings which will appear next may be reserved, after the phase II screen copy in colors, on the color copy.

The process of film-covering consists of using an optical divider (prism) which permits obtaining two images of the scene, on two different films. The one of them, pulled out very thick, will be loaded next in the camera and will permit, in two filmings, the one of the new decoration, the other of the original scene, realizing the artifice. The composition of a background, serving as decoration, may be composed by the computer. Indeed, as for a film-covering, a new film decoration is obtained, with, at RESERVE, the displacements of the characters preserved by the film covering. A superposition with the initial filming will permit delivering, in their reserved "emplacement", the characters such that they are filmed.

There is thus a process for covering and counter-covering where the film plays the role of a changeable covering. This process of trick photography may be used by the process according to the invention which utilizes the screen copier.

Another process consists of causing to play with the chromatic selection and the system of filters: the decoration is filmed, as for a transparency, but instead of being projected, it is pulled on a positive RED SHADER.

This positive serves next as filter: it is loaded before the blank negative, in the filming camera.

The characters will evolve therefore, covered by and illuminated in red, while the decorative backgrounds will be tinted in violet-blue. The red positive absorbing the other radiations, there will not remain, on the negative, the reproduction of the red positive and the characters, likewise red, that have just been filmed. This other process of trick photography may similarly be inserted in the process according to the invention. The decoration and/or the characters may be composed by the computer.

Figure 6:
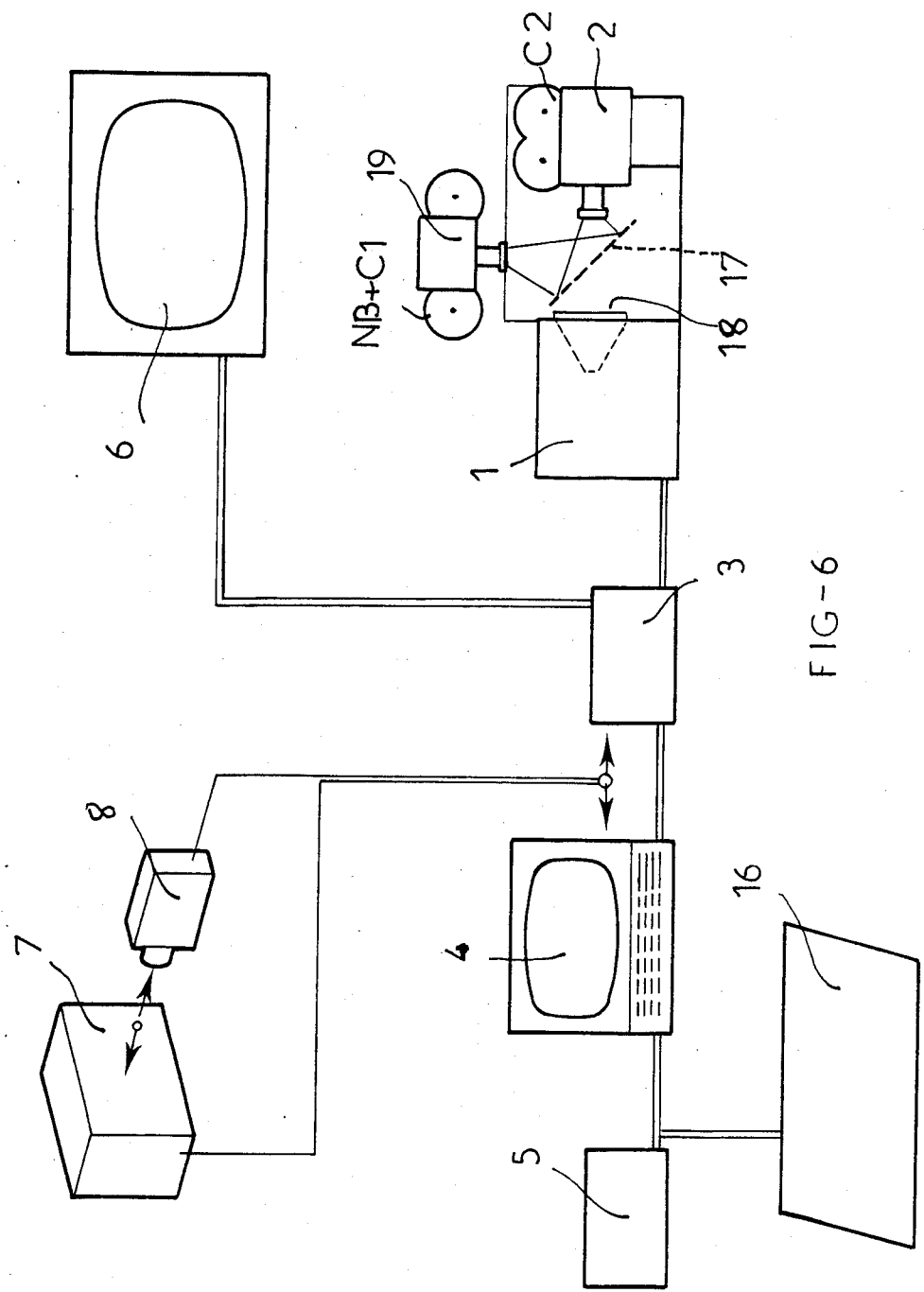
FIG. 6 is a diagram of the apparatus displaying the configuration of the equipment utilized.

The apparatus shown in FIG. 6 is composed of the following elements:
- a central computer 4 with its memory unit 5 for the recording in memory of the subtitles,
- a vectorial treatment unit (graphical process) 3,
- a screen copier 1, with its camera 2,
- a color monitor 6,
- a coloration logic unit, depending on the circumstances,
- a mounting table screen 7,
- a supplementary digital camera 8.

At the level of the screen copier 1, there is disposed a means serving as a semi-reflecting mirror 17. The said semi-reflecting mirror is disposed between the screen 18 of the screen copier and the camera 2. A projector 19, able to project at least two superposed films NB+C1, is set in place in the screen copier 2, so as to project an image I1 on the said semi-reflecting mirror 17. The camera 2 may thus film this image I1 which is superposed with the image I2 of the screen 18 which is seen through the said semi-reflecting mirror 17.

An original film C2 or a copy to be recopied may thus directly be obtained.

The filmed image I3 is the superposition of images I1 and I2. The screen copier 1 may diffuse at the level of its screen 18, it will be understood, colored subtitles STR, but likewise all other drawing such as animated drawings or plans for animated drawing facilitating the animation of the said drawings.

The reflecting mirror 17 can make an angle of about 45° with the vertical.

What is claimed is:

1. Process for subtitling or trick photography of cinematographic films, comprising:
    digitalizing and recording in a computer certain frames of a color cinematographic film to be treated;
    using said computer to generate foreground images and simultaneously to store said generated foreground images;
    projecting said generated foreground images onto a video screen;
    filming said generated and projected foreground images to produce a black-and-white film;
    developing said black and white film to produce a developed film in which said foreground images are black and substantially opaque, said film having a substantially transparent background;
    superposing and projecting said developed black and white film and said color cinematographic film to form a projected image of said color film with reserved spaces corresponding to said foreground images of said black and white film;
    retrieving said stored generated foreground images from said computer and using a coloration logic unit internal to said computer to color said stored foreground images in accordance with said recorded certain frames of said color film to be treated;
    projecting said colored generated foreground images onto said video screen;
    exposing a final film copy to said projected superposed image and said video-projected colored generated foreground images, to form a final film comprising certain frames having composite color background and generated color foreground images.

2. Process according to claim 1, wherein said final film copy is exposed to said projected superposed image to form a final film copy having unexposed portions corresponding to said generated foreground images, and said final film copy is subsequently exposed to said video-projected generated colored foreground images to form said final film.

3. Process according to claim 1, wherein a screen copier is used to film said projected superposed image and said video-projected colored generated images, and a semi-reflecting mirror is angularly disposed between said video screen and said final film copy, said final film copy being exposed simultaneously to said projected superposed image and said video-projected color generated foreground images.

4. Process according to claim 1, wherein said coloration logic unit colors said stored generated foreground images in colors complementary to colors occurring on said color cinematographic film, adjacent said reserved spaces.

5. Process according to claim 3, wherein said coloration logic unit is adjustable to vary the coloration of said generated images, and said projected superposed image and said video-projected colored generated foreground images are visually monitored prior to exposure of said final film copy.

6. Process according to claim 1, wherein said generated images are subtitles.

7. Process according to claim 1, wherein said coloration logic unit controls color filters to impart desired colors to said stored generated images.

8. Process according to claim 3, wherein a projector is used to project said superposed projected image onto a reflective side of said semi-reflecting mirror, and said video screen projects said colored generated foreground images onto a transmitting side of said semi-reflecting mirror, said semi-reflecting mirror being so disposed as perfectly to position said video-projected colored generated foreground images within said reserved spaces and onto said final film copy.

* * * * *